United States Patent
Tanaka

(10) Patent No.: US 7,369,762 B2
(45) Date of Patent: May 6, 2008

(54) PROJECTOR DEVICE, AND PHOTOGRAPHING METHOD AND PROGRAM OF PROJECTED IMAGE

(75) Inventor: Akira Tanaka, Musashimurayama (JP)

(73) Assignee: Casio Computer Co., Ltd., Tokyo (JP)

( * ) Notice: Subject to any disclaimer, the term of this patent is extended or adjusted under 35 U.S.C. 154(b) by 287 days.

(21) Appl. No.: 11/226,952

(22) Filed: Sep. 15, 2005

(65) Prior Publication Data

US 2006/0067673 A1 Mar. 30, 2006

(30) Foreign Application Priority Data

Sep. 27, 2004 (JP) ............................. 2004-280711

(51) Int. Cl.
G03B 17/48 (2006.01)
G03B 7/00 (2006.01)

(52) U.S. Cl. ...................................... 396/429; 396/213

(58) Field of Classification Search ................ 396/213, 396/242, 429, 430
See application file for complete search history.

(56) References Cited

U.S. PATENT DOCUMENTS 6,449,007 B1 * 9/2002 Yokoyama ................... 348/73
6,972,736 B1 * 12/2005 Wada et al. .................. 345/32

FOREIGN PATENT DOCUMENTS

JP 2004-208089 A 7/2004

* cited by examiner

Primary Examiner—Rodney Fuller
(74) Attorney, Agent, or Firm—Frishauf, Holtz, Goodman & Chick, P.C.

(57) ABSTRACT

A protector device is provided which includes a projecting system, a photographing system, and a control section. The projecting system includes a light source lamp, a micromirror element, and a projecting lens, and each image for each of a plurality of color components is time-divided by use of a color wheel, projected, and displayed with respect to an input color image signal. The photographing system includes a photographing lens, a CCD, and a processing circuit in which the projected and displayed image is photographed in accordance with an instruction, when the photographing of the projected and displayed image is instructed. And the control section detects a rotation position of the color wheel with a marker sensor and controls the photographing system to execute the photographing in synchronization with a time division period for each color component in the projecting system.

24 Claims, 6 Drawing Sheets

PROJECTOR DEVICE, AND PHOTOGRAPHING METHOD AND PROGRAM OF PROJECTED IMAGE

CROSS-REFERENCE TO RELATED APPLICATIONS

This application is based upon and claims the benefit of priority from prior Japanese Patent Application No. 2004-280711, filed Sep. 27, 2004, the entire contents of which are incorporated herein by reference.

BACKGROUND OF THE INVENTION

1. Field of the Invention

The present invention relates to a projector device, having a photographing function capable of photographing and recording projected contents, a method of photographing a projected image, and a program.

2. Description of the Related Art

In recent years, with spread of personal computers, portable projector devices have been more familiar which can perform various types of presentations, demonstrations and the like, when connected to notebook or handheld types of personal computers.

As this type of projector device, there are: a device in which a transmission type of color liquid crystal panel is used as an element to form an optical image; and a device of a digital light processing (DLP) (registered trademark) system in which an optical semiconductor device referred to as a micromirror element is used.

In the projector device of the DLP (registered trademark) system, a disc-shaped member referred to as a color wheel in which color filters (segments) of red, green, blue, and white are dividedly arranged on the same circumference is driven and rotated to color high-luminance white light from a light source lamp in time division (precisely, the only light of a corresponding color component is selectively transmitted). Thereafter, the light is reflected by a micromirror element driven and displayed to form the optical image corresponding to the color component, and the reflected light is projected on a screen or the like which is a projection object via a lens of an optical projection system.

Moreover, especially even in a projector device using a liquid crystal display panel referred to as a field sequential system, a basic concept closely resembles that of the projector device of the above-described DLP (registered trademark) system in that a light source lamp of three colors R, G, B is driven and lit in time division, and the image corresponding to the color component is displayed in a monochromatic liquid crystal display panel in each lighting period.

Therefore, there is also a need to record the image projected as described above in a digital camera separately prepared, for example, in making minutes. However, in the above-described projector device which is driven in time division for each color component constituting the image, there is a high possibility that an image having a large color unbalance is recorded depending on a photographing timing.

FIG. 6 shows a rotated state of the color wheel and the photographing timing in the general projector device of the DLP (registered trademark) system. In the figure, a frame frequency of an input image signal is 60 Hz, and the frequency is further divided into two in order to suppress flickering of the image so that the same image is projected and displayed twice at 120 Hz.

FIG. 6(1) shows a vertically synchronous signal synchronized with the input image signal, and FIG. 6(2) shows the segments of the color wheel which is driven and rotated in synchronization with the signal and which is inserted into an optical projection axis from the light source lamp.

It is now assumed that a shutter button of a digital camera is operated to photograph the projected image at a timing shown in FIG. 6(3), and thereafter the photographing is executed with a time lag as much as a time for each processing of autofocusing (AF) and automatic exposure (AE).

FIG. 6(4) shows a photographing timing (=exposure timing in which a mechanical shutter of the digital camera is actually opened) in a case where the image is photographed at a shutter speed which is sufficiently higher than one frame period of 1/120 second. Naturally, the timing is not synchronized with the rotated state of the color wheel. This timing centers on the green (G) segment of the color wheel which is disposed in the optical projection axis, and the photographing is executed ranging from a part of the previous red (R) segment to a part of the subsequent blue (B) segment.

In this case, the image obtained by the photographing is an entirely greenish image, because an exposure time of the image of a green (G) component is longer than that of the image of each of red (R) and blue (B) components.

FIG. 6(5) shows a photographing timing in a case where a focal number (F) is set to be large, and the shutter speed is set to be low in order to avoid the above-described situation. In this case, when the shutter speed is set to a low speed, for example, of 1/15 or 1/30 second, the exposure time is sufficiently long as compared with a rotation period of the color wheel. Therefore, the photographed image does not have unbalanced color components and is not unnatural. However, the image is easily influenced by hands movement. Moreover, there is a high possibility of an overexposure depending on brightness of the projected and displayed image.

The present invention has been developed in view of the above-described situations, and an object is to provide a projector device which is of such a system as to perform time-division projecting and driving for each of a plurality of color components of a color image and which can securely photograph a projected image having a satisfactory color balance, and a method and a program for photographing a projected image.

BRIEF SUMMARY OF THE INVENTION

According to one aspect of the present invention, there is provided a device comprising:

projecting means for time-dividing, projecting, and displaying each image for each of a plurality of color components with respect to an input color image signal;

instructing means for instructing photographing of the image projected and displayed by the projecting means;

photographing means for photographing the projected and displayed image in accordance with the instruction of the instructing means; and photographing control means for allowing the photographing means to execute the photographing in synchronization with a time division timing for each color component in the projecting means and at a shutter speed corresponding to a time division period, when the photographing is instructed by the instructing means.

According to another aspect, there is provided a method of photographing a projected image in a projector device provided with a projecting section which time-divides, projects, and displays each image for each of a plurality of color components with respect to an input color image signal, and a photographing section which photographs the projected and displayed image, the method comprising:

an instructing step of instructing the photographing section to photograph the image; and a photographing control step of allowing the photographing section to execute the photographing in synchronization with a time division timing for each color component in the projecting section and at a shutter speed corresponding to a time division period, when the photographing is instructed in the instructing step.

According to still another aspect, there is provided a program executed by a computer built in a projector device provided with a projecting section which time-divides, projects, and displays each image for each of a plurality of color components with respect to an input color image signal, and a photographing section which photographs the projected and displayed image, the program allowing the computer to execute:

an instructing step of instructing the photographing section to photograph the image; and a photographing control step of allowing the photographing section to execute the photographing in synchronization with a time division timing for each of the color components in the projecting section and at a shutter speed corresponding to a time division period, when the photographing is instructed in the instructing step.

According to the aspects, since the photographing is synchronized with the time division timing for each color component during the projecting, and executed at the shutter speed corresponding to the time division period, the projected image whose color is balanced can be securely photographed.

DETAILED DESCRIPTION OF THE INVENTION

One embodiment of the present invention applied to a projector device will be described hereinafter with reference to the drawings.

Figure 1A:
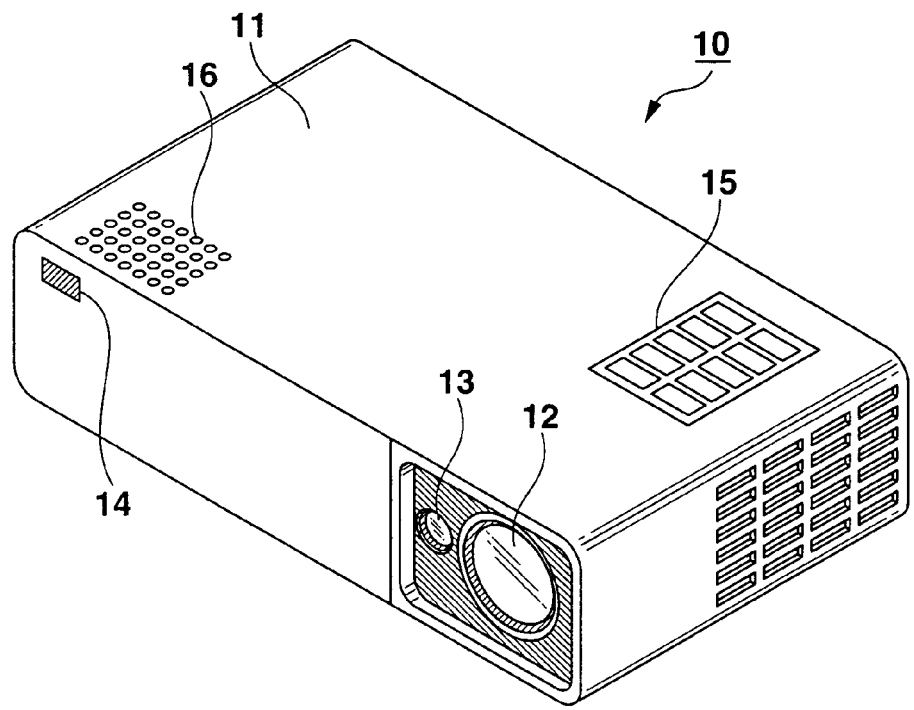
FIG. 1A is a perspective view showing an appearance constitution of a projector device according to one embodiment of the present invention.

FIG. 1A shows an appearance constitution of a projector device 10 according to the present embodiment, and mainly shows constitutions of front and upper surfaces of a housing. As shown in the figure, a projecting lens 12 and a photographing lens 13 are buried in a part of the front surface of a rectangular parallelepiped main body casing 11 on the right side as one faces the figure. An IR receiving section 14 is disposed in a left end of the front surface of the main body casing 11.

The projecting lens 12 projects on an object such as a screen an optical image formed by a spatial optical modulator such as a micromirror element described later. Here, a focal position and a zoom position (projection field angle) can be arbitrarily varied.

The photographing lens 13 photographs the image projected and displayed by the projecting lens 12. The focal and zoom positions of the photographing lens 13 are also variable. Especially, the zoom position is controlled in conjunction with that of the projecting lens 12 in such a manner as to obtain a photographing region corresponding to a size of the image projected by the projecting lens 12.

The IR receiving section 14 receives an infrared light (IR) signal on which a key operation signal from a remote controller of the projector device 10 is superimposed.

Figure 1B:
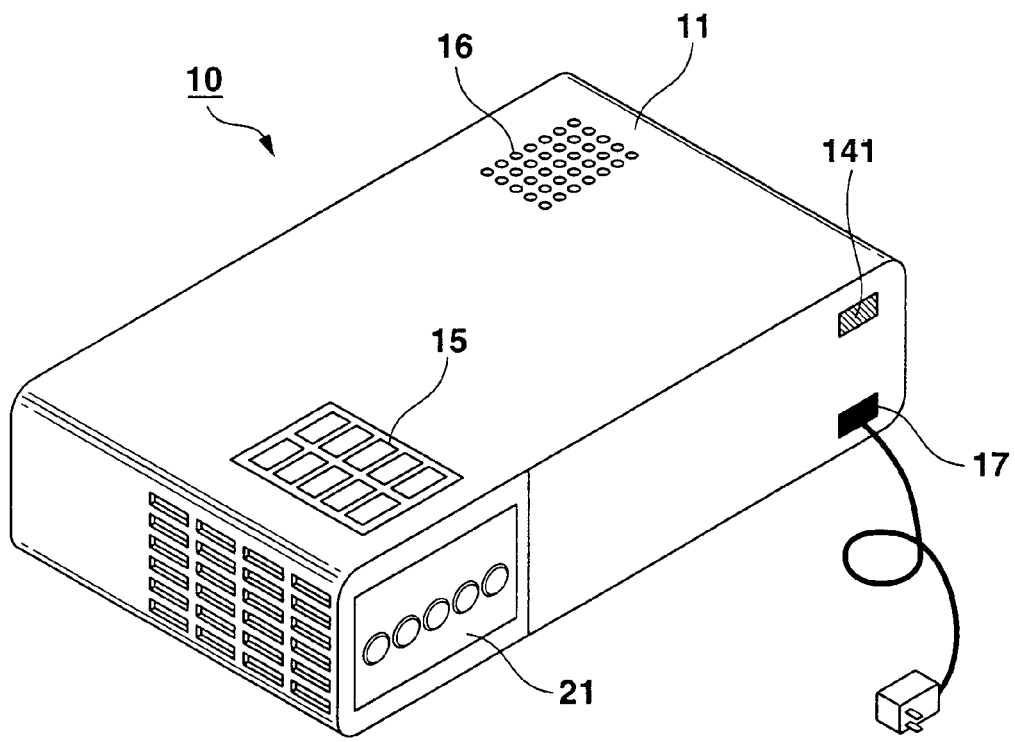
FIG. 1B is a perspective view showing an appearance constitution of the projector device according to one embodiment of the present invention.

Moreover, FIG. 1B shows an appearance constitution of the projector device 10 according to the present embodiment, and mainly shows back and upper surface constitutions of the housing. As shown in the figure, a switching section 15 and a loudspeaker 16 are disposed in the upper surface of the main body casing 11. The switching section 15 is constituted of various key switches which instruct an on/off state of a power supply of the device, input switching, automatic focusing, automatic keystone distortion correction and the like.

The loudspeaker 16 amplifies and releases an input voice signal, beep sound at an operation time, and the like.

Moreover, on the back surface of the main body casing 11, there are disposed an input/output connector section 21, an IR receiving section 141 similar to the IR receiving section 14, and an AC adaptor connecting section 17. The input/output connector section 21 is constituted of, for example, a USB terminal to be connected to an external device such as a personal computer, a mini D-SUB terminal for video input, an S terminal, an RCA terminal, a stereo mini terminal for voice input and the like.

The AC adaptor connecting section 17 is connected to a cable from an AC adapter which is a power supply.

Figure 2:
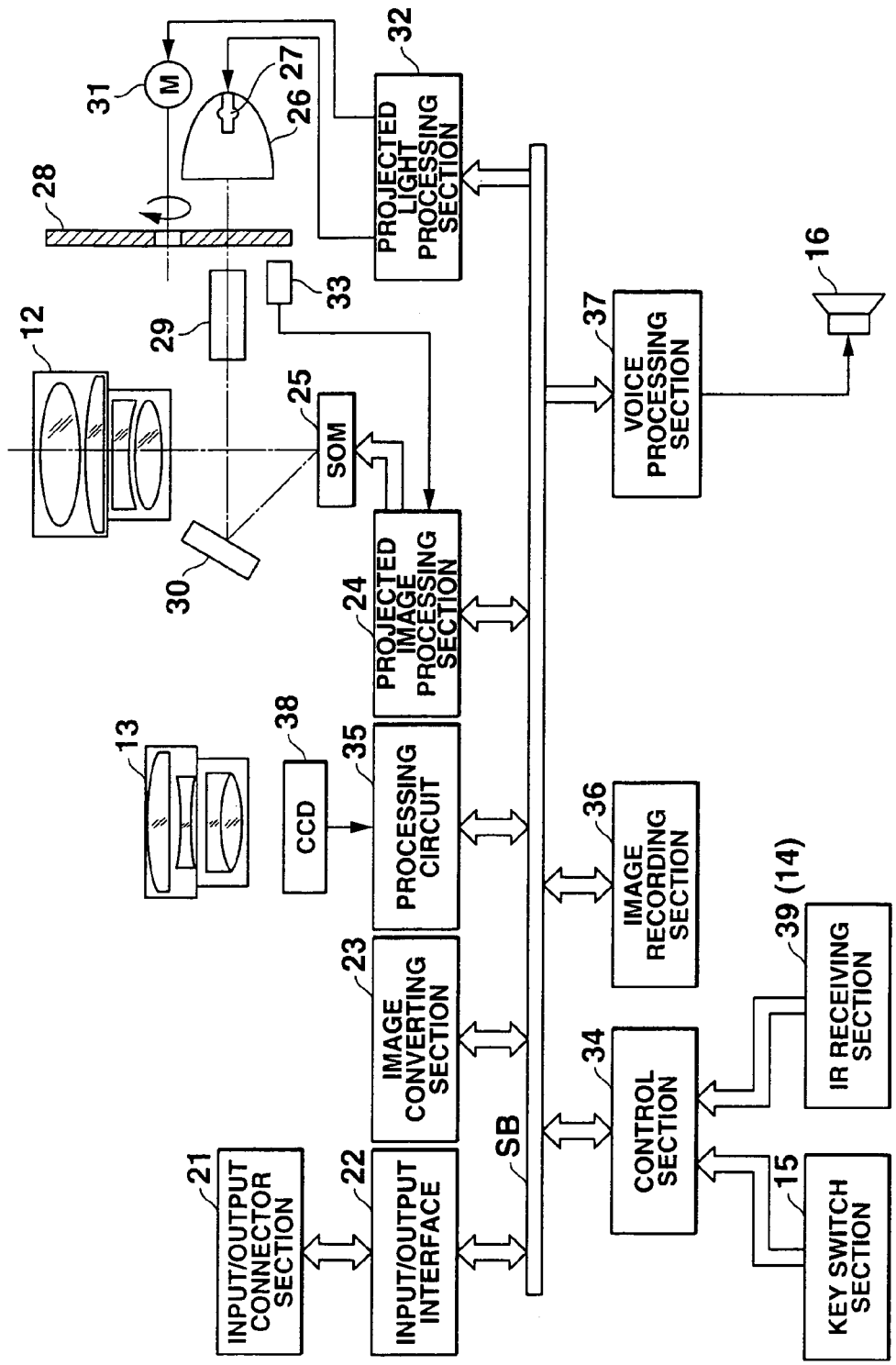
FIG. 2 is a block diagram showing a functional constitution of an electronic circuit of the projector device according to the embodiment.

Next, a functional constitution of an electronic circuit of the projector device 10 will be described with reference to FIG. 2. In the figure, image signals having various types of standards are input from the input/output connector section 21, unified into an image signal having a predetermined format by an image converting section 23 via an input/output interface 22 and a system bus SB, and thereafter sent to a projected image processing section 24.

The projected image processing section 24 generates a video signal from the sent image signal, and appropriately multiplies the signal with a frame rate of, for example, 120 frames/second, the number of divided color components, and the number of display gradations. A spatial optical modulator (SOM) 25, for example, a micromirror element 25 is driven for display in time division at a higher speed.

High-luminance white light emitted by a light source lamp 27 disposed in a reflector 26 is appropriately colored in primary colors via a color wheel 28, and the micromirror element 25 is irradiated with the light via an integrator 29 and a mirror 30. Accordingly, an optical image is formed by the reflected light, and projected and display in a screen via the projecting lens 12.

Additionally, the light source lamp 27 is driven and lit, and a motor 31 for driving and rotating the color wheel 28 is operated based on a supply voltage value from a projected light processing section 32.

Moreover, a predetermined rotated position of the color wheel 28 is detected by a marker sensor 33 disposed in the vicinity of a peripheral end surface of the wheel, and a detection signal is input into the projected image processing section 24.

Figure 3:
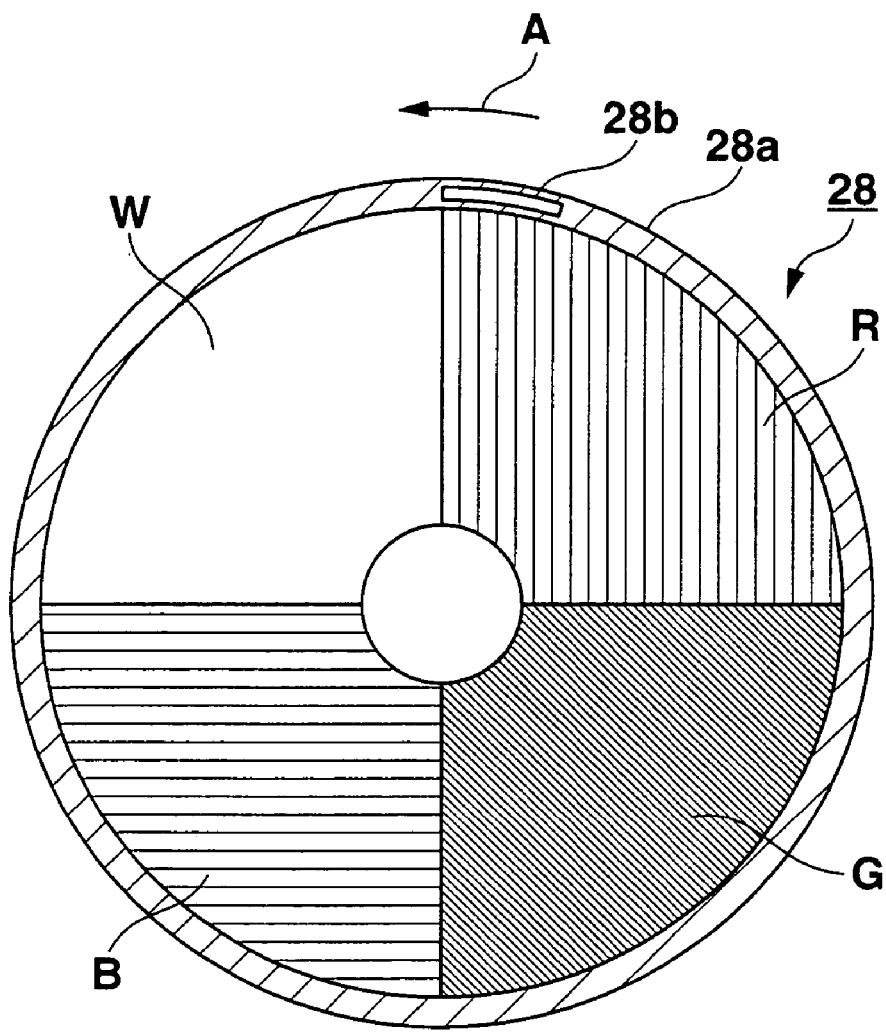
FIG. 3 is a plan view showing a specific structure of a color wheel according to the embodiment.

FIG. 3 shows a plane structure of the color wheel 28. Color filters referred to as segments of red (R), green (G), blue (B), and transparent (W) are arranged every central angle of 90° on the same circumference. A marker 28b constituted of a circular through hole is formed in a predetermined rotated position of a rim portion 28a in an outermost periphery, specifically, in an end portion corresponding to the red (R) segment in the vicinity of the transparent (W) segment, and the wheel rotates in a direction shown by an arrow A in the figure.

The marker sensor 33 is constituted of, for example, a reflective type photointerrupter, and disposed in the vicinity of the color wheel 28 in such a manner as to face the rim portion 28a. Since the light emitted from an LED constituting the photointerrupter is not reflected by the rim portion 28a only in the marker 28b, and a level of an output signal of a light receiving element drops, the position of the marker 28b, that is, a start position of the red (R) segment can be detected.

A control section 34 controls all operations of the above-described respective circuits. This control section 34 comprises: a CPU; a nonvolatile memory which stores an operation program including processing such as a projecting or photographing operation described later and executed by the CPU; a working memory and the like.

The control section 34 is also connected to a processing circuit 35, an image recording section 36, and a voice processing section 37 via the system bus SB.

The processing circuit 35 receives an output of a CCD 38 which is an image pickup element which is disposed behind an optical photographing axis of the photographing lens 13 and which photoelectrically converts the optical image formed by the photographing lens 13. The circuit digitizes an image signal having an analog value from the CCD 38, performs color processing including pixel interpolation processing and y correction processing to generate a luminance signal Y and color difference signals Cb, Cr having digital values, and outputs the signals to the image converting section 23 via the system bus SB.

The image converting section 23 compresses data with respect to the luminance and color difference signals by processing such as ADCT and Huffman coding, and writes the resultant image data in the image recording section 36 disposed as a recording medium of the projector device 10. The image recording section 36 is constituted of, for example, a flash memory and the like, and stores the image data obtained by the photographing.

The voice processing section 37 is provided with a sound source circuit such as a PCM sound source, converts voice data given at a time of a projecting operation into analog data, and drives the loudspeaker 16 to amplify and release voice, or generates a beep sound if necessary.

It is to be noted that each key operation signal in the switching section 15 is directly input into the control section 34, and a signal from an IR receiving section 39 is also directly input. This IR receiving section 39 includes the Ir receiving section 14 and the IR receiving section 141 disposed on the back surface of the main body casing 11, converts the infrared receiving signal into a code signal, and sends the signal to the control section 34.

Figure 4:
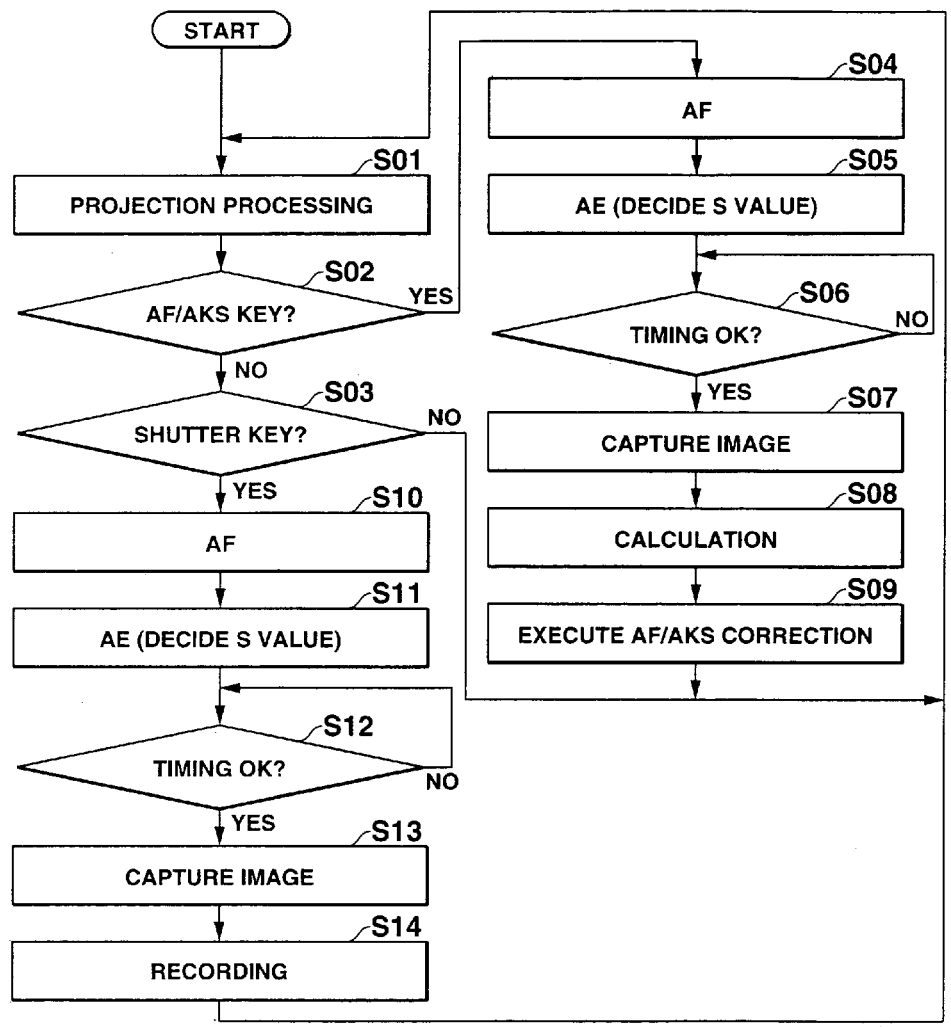
FIG. 4 is a flowchart showing processing contents concerning photographing of a projected image according to the embodiment.

Next, an operation of the above-described embodiment will be described. FIG. 4 shows processing contents mainly by the control section 34 in a case where an operation is executed to project an image input from an external device connected to the input/output connector section 21 at a time when a power supply is turned on.

At first, projection processing is executed in which the micromirror element 25 is driven for display based on the image signal input from the input/output connector section 21, the micromirror element 25 is irradiated with color light from the light source lamp 27 via the color wheel 28 to form the optical image, and the light is emitted from the projecting lens 12 (step S01).

While this projection processing is executed, the control section 34 repeatedly judges whether or not an operation signal of an "AF/AKS" key instructing the autofocusing (AF) and automatic keystone distortion correction (AKS) is input from the switching section 15 or the IR receiving section 39 (step S02). The section similarly repeatedly judges whether or not an operation signal of the shutter key instructing the photographing of the projected image from the switching section 15 or the IR receiving section 39 (step S03), and accordingly waits for these key operations.

Figure 5:
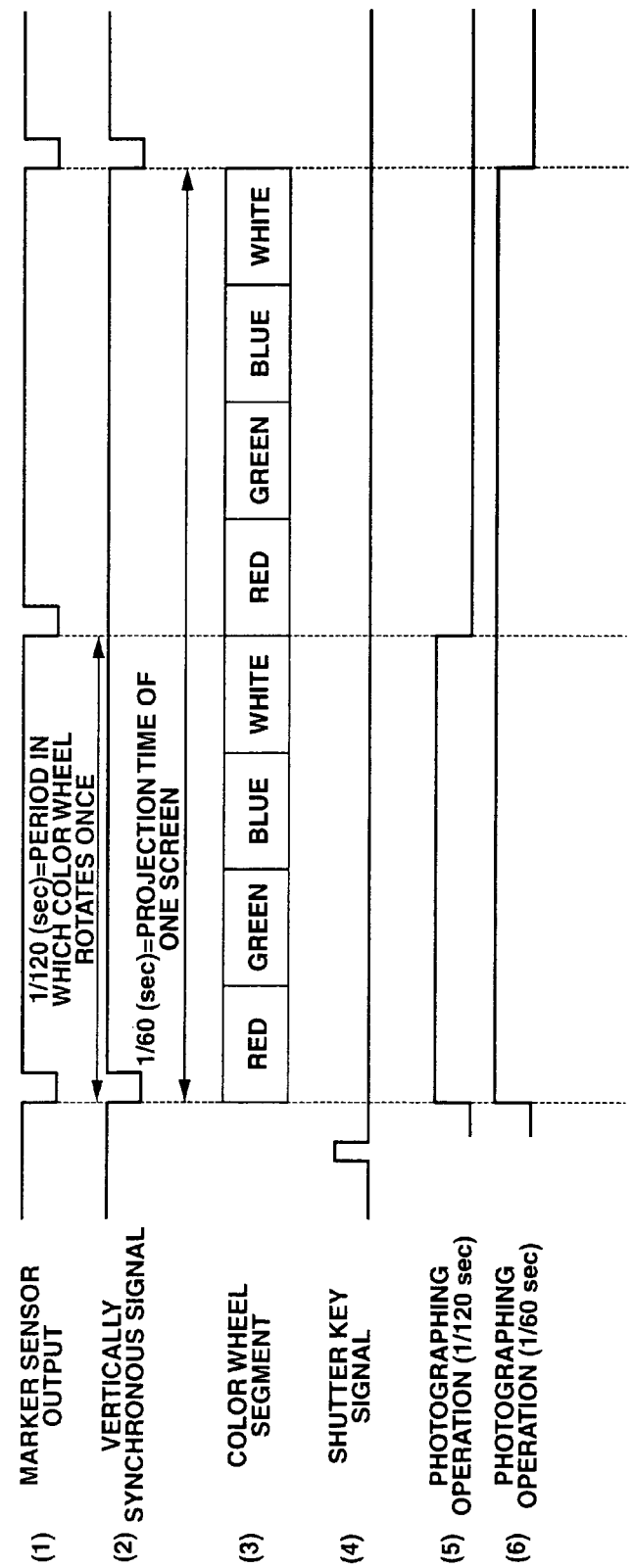
FIG. 5 is a timing chart showing a processed state of each section concerning the photographing of the projected image according to the embodiment.
Figure 6:
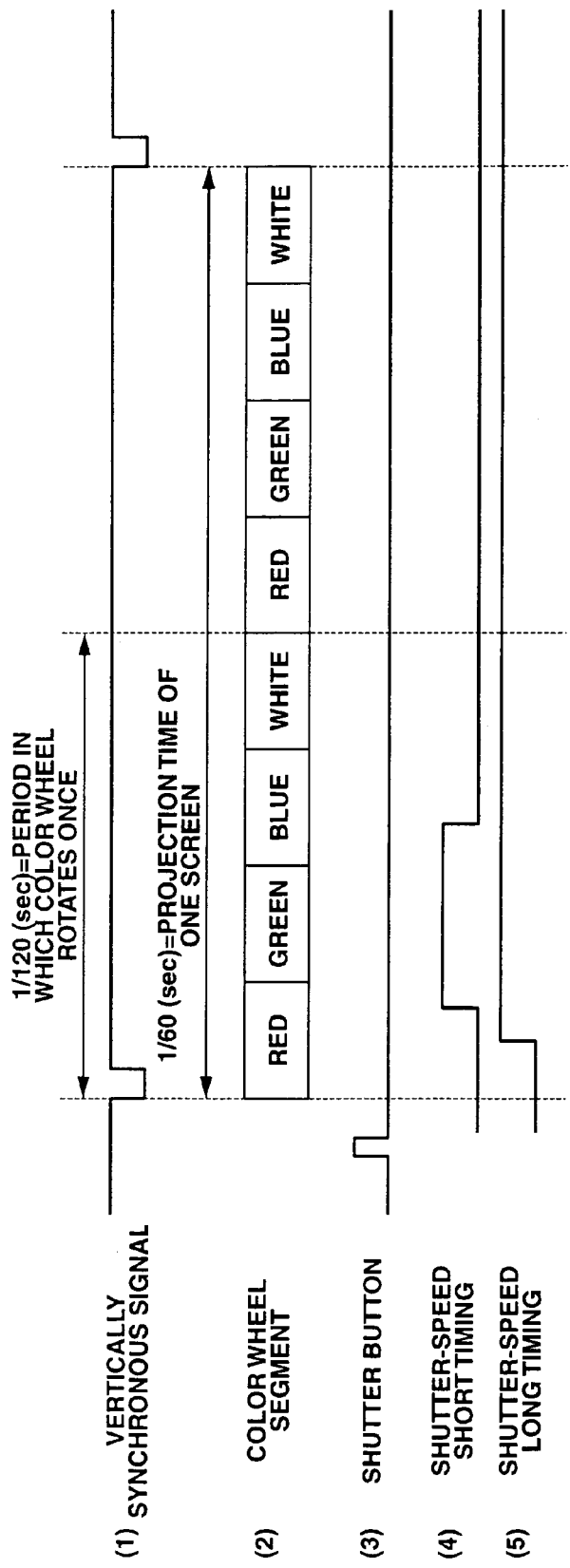
FIG. 6 is a timing chart showing a projector device which time-divides and projects an image for each color component, and a photographing timing of the projected image.

FIG. 5 shows a timing of each section relating to the projection of the image and the photographing of the projected image. In the figure, a frame frequency of the input image signal is 60 Hz, the frequency is doubled in order to suppress flickering of the image, and the same image is projected and displayed twice at 120 Hz.

FIG. 5(2) shows a vertically synchronous signal synchronized with the input image signal, and FIG. 5(3) shows the segments of the color wheel 28 driven and rotated in synchronization with the signal, and inserted into the optical projection axis from the light source lamp.

With the rotation of the color wheel 28, the detection signal from the marker sensor 33 is obtained in synchronization with the head of the red (R) segment of the color wheel 28 as shown in FIG. 5(1), and this is equivalent to a signal obtained by doubling the vertically synchronous signal shown in FIG. 5(2).

When the operation signal of the "AF/AKS" key is input from the switching section 15 or the IR receiving section 39 during the execution of the above-described projecting operation, this is judged in step S02, and the photographing lens 13 is driven to obtain a focal distance value from the lens position where a contrast value is highest (step S04). When an appropriate exposure value is obtained, a shutter speed (S value) which is an integer multiple of one period of 1/120 second of the image projection and the corresponding focal number (F value) are decided (step S05).

Thereafter, after waiting for a certain timing (falling of a level) of the detection signal from the marker sensor 33 shown in FIG. 5(2) (step S06), and judging that it is the timing, the lens position of the photographing lens 13, scanning driving time of the CCD 38 and the like are controlled in accordance with the focal distance value and the S and F values to execute the photographing of the projected image (step S07).

The photographed image data obtained in this manner is taken out of the processing circuit 35, and a region of the projected image is executed to thereby execute an operation for calculating distortion amounts of horizontal and vertical directions (step S08). After executing the autofocusing (AF) operation and the automatic keystone distortion correction (AKS) operation to handle the key scanning based on the obtained contents (step S09), the processing returns to the step S01, and the projecting operation is continued.

Moreover, when the operation signal of the shutter key is input from the switching section 15 or the IR receiving section 39 as shown in FIG. 5(4) during the execution of the projecting operation, this is judged in the step S03, and the photographing lens 13 is driven to obtain the focal distance value from the lens position where the contrast value is highest (step S10). Moreover, the appropriate exposure value is obtained to thereby decide the shutter speed (S value) which is an integer multiple of one period of 1/120 second of the image projection, and the corresponding focal number (F value) (step S11).

Thereafter, after waiting for the certain timing (falling of a level) of the detection signal from the marker sensor 33 shown in FIG. 5(1) (step S12), and judging that it is the timing, the lens position of the photographing lens 13, scanning driving time of the CCD 38 and the like are controlled in accordance with the focal distance value and the S and F values to execute the photographing of the projected image (step S13).

FIG. 5(5) shows photographing operation timings in a case where the shutter speed is set to 1/120 second. Needless to say, a rotation phase of the color wheel 28 precisely agrees with that shown in FIG. 5(3), and it is seen that the projected image can be photographed with a correct color balance.

Moreover, FIG. 5(6) shows photographing operation timings in a case where the shutter speed is set to 1/60 (=(1/120)×2) second. Also in this case, needless to say, the rotation phase of the color wheel 28 precisely agrees with that for two periods of the color wheel shown in FIG. 5(3), and it is also seen that the projected image can be photographed with the correct color balance.

The data of the image photographed with this correct color balance is subjected to color processing in the processing circuit 35, thereafter subjected to data compression processing in conformity to, for example, JPEG standards by the image converting section 23, and recorded in the image recording section 36 (step S14). Thereafter, the processing returns to the step S01 to prepare for the next photographing.

When the rotation phase of the color wheel 28 is detected in this manner, the photographing can be synchronized with the time division timing for each of the color components of the projected image, and executed at the shutter speed corresponding to the time division period. Therefore, whenever the execution of the photographing is instructed, it is possible to photograph the projected image securely with the correct color balance constantly.

Additionally, the shutter speed which is the exposure time of the photographing is appropriate adjusted as integer times the time division period. Therefore, the photographing can be executed in an appropriate exposed state corresponding to brightness of the projected image.

It is to be noted that the application to the projector device of the DLP (registered trademark) system has been described in the present embodiment, but the present invention is not limited to this embodiment. For example, even in a liquid crystal projector of a field sequential system in which a light source lamp of, for example, three colors RGB is driven and lit in time division, a similar detection signal is obtained from a driving control signal of the light source lamp, and the projected image can be photographed in concurrence with the time division period.

Additionally, the present invention is not limited to the above-described embodiment, and can be variously modified and carried out within a range that does not depart from the scope.

Furthermore, the above-described embodiment includes various stages of inventions, and various inventions can be extracted by an appropriate combination of a plurality of described constituting requirements. For example, even when several constituting requirements are omitted from all of the constituting requirements described in the present embodiment, at least one of the problems described in the paragraphs of the problems to be solved by the invention can be solved, and at least one of the effects described in the paragraphs of the effects of the invention is obtained. In this case, the constitution from which the constituting requirements are deleted can be extracted as the invention.

What is claimed is:

1. A projector device comprising:
projecting means for time-dividing, projecting, and displaying each image for each of a plurality of color components with respect to an input color image signal;
instructing means for instructing photographing of the image projected and displayed by the projecting means;
photographing means for photographing the projected and displayed image in accordance with the instruction of the instructing means; and
photographing control means for controlling the photographing means to execute the photographing in synchronization with a time division timing for each color component in the projecting means and at a shutter speed corresponding to a time division period, when the photographing is instructed by the instructing means.

2. The projector device according to claim 1, wherein the shutter speed is an integer multiple of the time division period.

3. The projector device according to claim 1, wherein the projecting means comprises:
a color wheel in which a plurality of color filters are dividedly arranged on a same circumference and selectively transmit light of the color component from white light from a light source by rotation of the color wheel; and
a detection mechanism which detects a rotation phase of the color wheel, and
wherein the photographing control means controls the photographing means to execute the photographing synchronized with the time division timing for each color component in the projecting means based on a detection signal from the detection mechanism.

4. The projector device according to claim 1, wherein the instructing means instructs the photographing in response to a signal from an IR receiving section.

5. The projector device according to claim 1, wherein the projecting means is a field sequential system.

6. The projector device according to claim 1, wherein the photographing control means controls the photographing means to execute the photographing at the shutter speed corresponding to the time division period as much as a period to constitute a color image with respect to the color image projected by the projecting means.

7. A method of photographing a projected image in a projector device provided with a projecting section which timedivides, projects, and displays each image for each of a plurality of color components with respect to an input color image signal, and a photographing section which photographs the projected and displayed image, the method comprising:
  instructing image photographing; and
  controlling the photographing section to execute the photographing in synchronization with a time division timing for each color component in the projecting section and at a shutter speed corresponding to a time division period, when the photographing is instructed.

8. The method of photographing the projected image according to claim 7, wherein the shutter speed is set to an integer multiple of the time division period.

9. The method of photographing the projected image according to claim 7, wherein the projecting section comprises:
  a color wheel in which a plurality of color filters are dividedly arranged on a same circumference and selectively transmit light of the color component from white light from a light source by rotation of the color wheel; and
  a detection mechanism which detects a rotation phase of the color wheel, and
  wherein the photographing section is controlled to execute the photographing synchronized with the time division timing for each color component in the projecting section based on a detection signal from the detection mechanism.

10. The method of photographing the projected image according to claim 7, wherein the photographing is instructed in response to a signal from an IR receiving section.

11. The method of photographing the projected image according to claim 7, wherein the projecting section is a field sequential system.

12. The method of photographing the projected image according to claim 7, wherein the photographing is controlled to be executed at the shutter speed corresponding to the time division period as much as a period to constitute a color image with respect to the color image projected by the projecting section.

13. A recording medium having stored thereon a computer program which is executable by a computer in a projector device provided with a projecting section which timedivides, projects, and displays each image for each of a plurality of color components with respect to an input color image signal, and a photographing section which photographs the projected and displayed image, said computer program controlling the computer to execute functions of:
  instructing image photographing; and
  controlling the photographing section to execute the photographing in synchronization with a time division timing for each color component in the projecting section and at a shutter speed corresponding to a time division period, when the photographing is instructed.

14. The recording medium according to claim 13, wherein the computer program controls the shutter speed to be set to an integer multiple of the time division period.

15. The recording medium according to claim 13, wherein the projecting section comprises:
  a color wheel in which a plurality of color filters are dividedly arranged on a same cirumference and selectively transmit light of the color component from white light from a light source by rotation of the color wheel; and
  a detection mechanism which detects a rotation phase of the color wheel, and
  wherein the computer program controls the photographing section to execute the photographing synchronized with the time division timing for each color component in the projecting section based on a detection signal from the detection mechanism.

16. The recording medium according to claim 13, wherein the computer program controls the photographing to be instructed in response to a signal from an IR receiving section.

17. The recording medium according to claim 13, wherein the projecting section is a field sequential system.

18. The recording medium according to claim 13, wherein the computer program controls the photographing to be executed at the shutter speed corresponding to the time division period as much as a period to constitute a color image with respect to the color image projected by the projecting section.

19. A projector device comprising:
  a projecting unit which timedivides, projects, and displays each image for each of a plurality of color components with respect to an input color image signal;
  an instructing unit which instructs photographing of the image projected and displayed by the projecting unit;
  a photographing unit which photographs the projected and displayed image in accordance with the instruction of the instructing unit; and
  a photographing control unit which controls the photographing unit to execute the photographing in synchronization with a time division timing for each color component in the projecting unit and at a shutter speed corresponding to a time division period, when the photographing is instructed by the instructing unit.

20. The projector device according to claim 19, wherein the shutter speed is an integer multiple of the time division period.

21. The projector device according to claim 19, wherein the projecting unit comprises:
  a color wheel in which a plurality of color filters are dividedly arranged on a same cirumference and selectively transmit light of the color component from white light from a light source by rotation of the color wheel; and
  a detection mechanism which detects a rotation phase of the color wheel, and
  wherein the photographing control unit controls the photographing unit to execute the photographing synchronized with the time division timing for each color component in the projecting unit based on a detection signal from the detection mechanism.

22. The projector device according to claim 19, wherein the instructing unit instructs the photographing in response to a signal from an IR receiving section.

23. The projector device according to claim 19, wherein the projecting unit is a field sequential system.

24. The projector device according to claim 19, wherein the photographing control unit controls the photographing unit to execute the photographing at the shutter speed corresponding to the time division period as much as a period to constitute a color image with respect to the color image projected by the projecting unit.

* * * * *